United States Patent
Agnew et al.

(10) Patent No.: US 8,517,442 B1
(45) Date of Patent: Aug. 27, 2013

(54) VEHICLE TRIM ATTACHMENT FASTENER

(71) Applicant: Nissan North America, Inc., Franklin, TN (US)

(72) Inventors: David Agnew, Clarkston, MI (US); Daniel Lizak, Howell, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/624,446

(22) Filed: Sep. 21, 2012

(51) Int. Cl.
*B60R 13/02* (2006.01)

(52) U.S. Cl.
USPC .............................. 296/1.08; 52/716.5; 24/289

(58) Field of Classification Search
USPC ................... 296/1.08, 39.1; 52/716.1, 716.4, 52/716.5, 716.6, 716.7, 718.01, 718.04–718.06, 52/718.02, 718.03; 24/289, 293, 294, 295, 24/581.11
See application file for complete search history.

(56) References Cited

U.S. PATENT DOCUMENTS

| | | | |
|---|---|---|---|
| 5,347,690 A * | 9/1994 | Mansoor et al. | 24/295 |
| 5,502,942 A | 4/1996 | Gras et al. | |
| 5,595,416 A * | 1/1997 | Horwill | 296/91 |
| 5,987,714 A | 11/1999 | Smith | |
| 6,123,385 A | 9/2000 | Bailey et al. | |
| 6,230,372 B1 | 5/2001 | Sokurenko et al. | |
| 6,606,766 B2 * | 8/2003 | Ko | 24/295 |
| 7,114,221 B2 | 10/2006 | Gibbons et al. | |
| 7,134,170 B2 | 11/2006 | Gibbons et al. | |
| 7,204,000 B2 | 4/2007 | Benedetti et al. | |
| 7,725,991 B2 | 6/2010 | Lubera et al. | |
| 2006/0168773 A1 * | 8/2006 | Smith et al. | 24/295 |

* cited by examiner

*Primary Examiner* — Dennis Pedder
*Assistant Examiner* — Beverly Becker
(74) *Attorney, Agent, or Firm* — Global IP Counselors, LLP

(57) ABSTRACT

A vehicle trim attachment fastener includes a base, a trim clip and a first trim alignment flange. The base has a vehicle body attachment structure. The trim clip extends outwardly away from a first end of the base and includes a plurality of attachment fingers defining a trim panel retaining area therebetween. The first trim alignment flange extends outwardly from one of the plurality of attachment fingers away from the trim panel retaining area. The first trim alignment flange defines a trim alignment aperture and is configured to align a trim panel relative to the trim clip during installation of the trim panel to the trim clip.

20 Claims, 8 Drawing Sheets

VEHICLE TRIM ATTACHMENT FASTENER

BACKGROUND

1. Field of the Invention

The present invention generally relates to a vehicle trim attachment fastener. More specifically, the present invention relates to a vehicle trim attachment fastener that retains a trim panel and aligns the trim panel relative to the vehicle attachment fastener during installation.

2. Background Information

Installation of a trim element or a trim panel within a vehicle is often performed manually by a manufacturing technician. The technician visually aligns areas of the trim element or trim panel with corresponding portions of the vehicle body structure during installation. However, installation can be made more difficult and time consuming when the attachments structures of the trim elements and trim panels are hidden or concealed during installation by the trim element or trim panel.

SUMMARY

One object is to provide an attachment fastener having a structure that facilitates quick and easy installation of a trim panel to a vehicle structure.

Another object is to provide an attachment fastener and a trim element with alignment structures that ensure proper alignment of the trim element relative to the vehicle structure during installation of the trim element.

In view of the state of the known technology, one aspect of the present disclosure is to provide a vehicle trim attachment fastener with a base, a trim clip and a first trim alignment flange. The base has a vehicle body attachment structure. The trim clip extends outwardly away from a first end of the base and includes a plurality of attachment fingers defining a trim panel retaining area therebetween. The first trim alignment flange extends outwardly from one of the plurality of attachment fingers away from the trim panel retaining area. The first trim alignment flange defines a trim alignment aperture and is configured to align a trim panel relative to the trim clip during installation of the trim panel to the trim clip.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
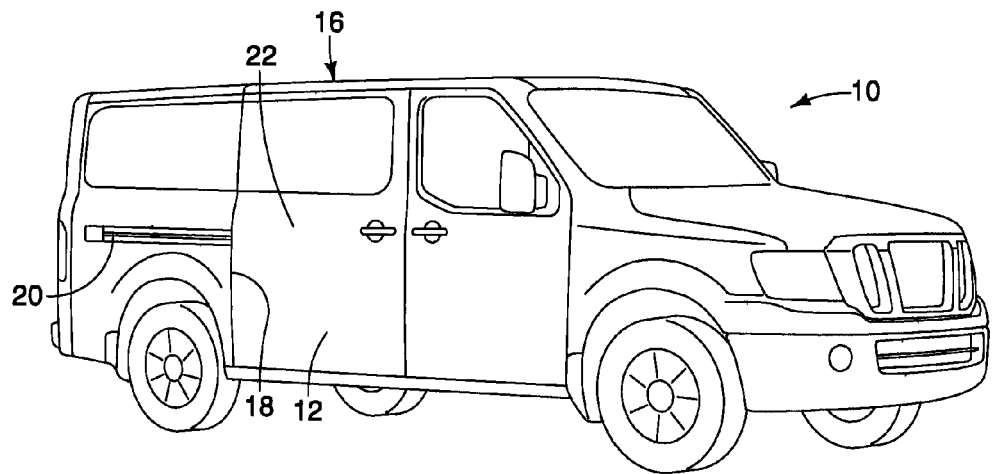
FIG. 1 is a perspective view of a vehicle that includes a vehicle body assembly in accordance with one embodiment.

Referring initially to FIG. 1, a vehicle 10 that includes a body assembly 12 having a plurality of attachment fasteners 14 (shown in FIGS. 3-5 and 9-16) is illustrated in accordance with a first embodiment. The attachment fasteners 14 are described in greater detail below, after brief descriptions of the vehicle 10 and the body assembly 12.

The vehicle 10 includes a body structure 16 having, among other things, structural elements (not shown), fenders, suspension and body panels that define a door opening 18. In the depicted embodiment, the body assembly 12 is a sliding door that slidably moves between a closed position shown in FIG. 1 and an open position (not shown). The body structure 16 includes tracks, such as a track 20, that support the body assembly 12 (the sliding door) during movement between the open position and the closed position in a conventional manner. Since sliding door structures and tracks are well known conventional features, further description is omitted for the sake of brevity.

Figure 2:
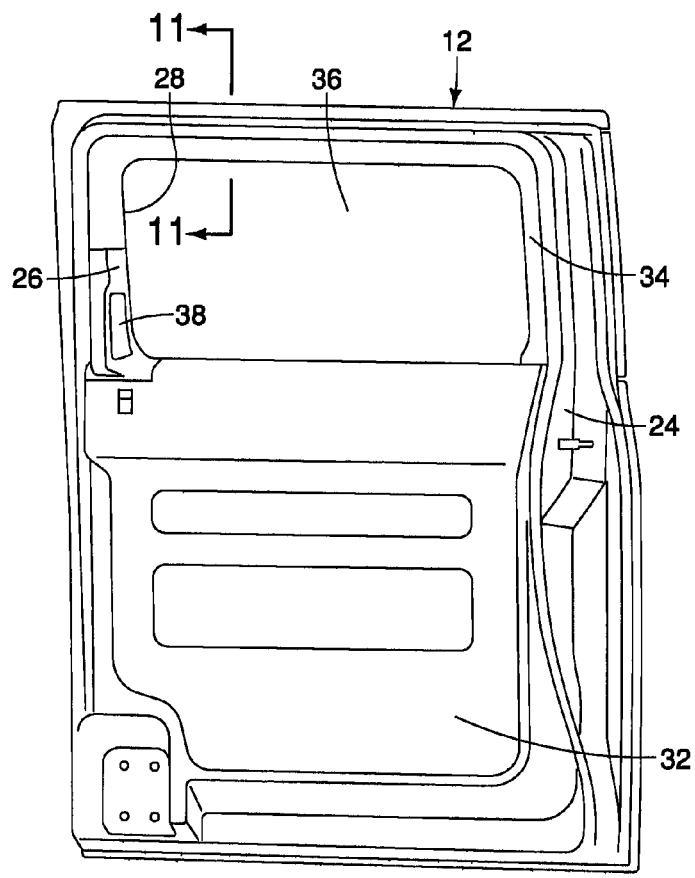
FIG. 2 is an interior view of a vehicle body assembly, specifically, a sliding door, that includes a trim panel retained to the vehicle body assembly in accordance with the one embodiment.

As shown in FIGS. 1 and 2, the body assembly 12 (the sliding door) includes an outer panel 22 (FIG. 1) and an inner panel 24 (FIG. 2) that are rigidly fixed to one another in a conventional manner, such as using welding techniques. The inner and outer panels 22 and 14 are contoured and shaped to define a window sash 26 that surrounds a window opening 28.

Figure 11:
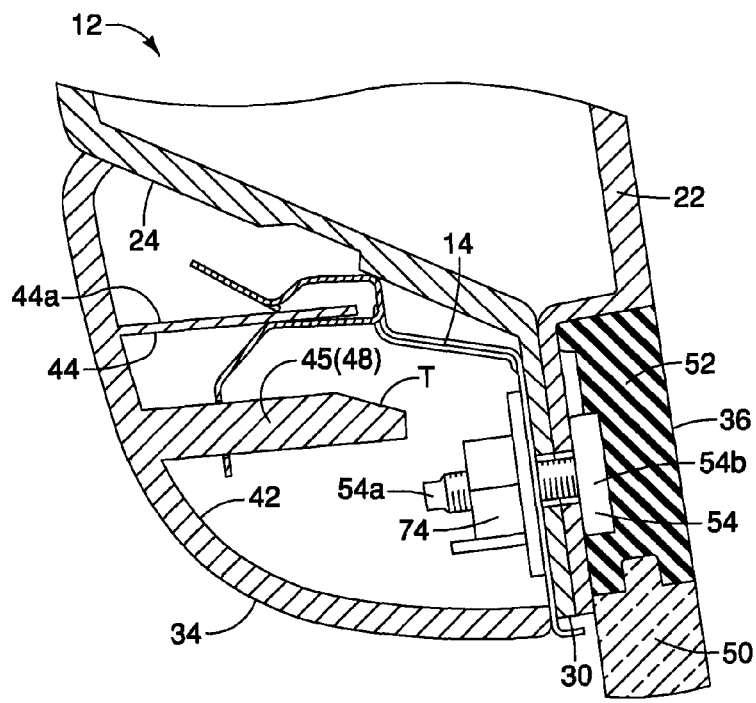
FIG. 11 is a cross-sectional view of the vehicle body assembly taken along the line 11-11 in FIG. 2, showing portions of the window sash of the body panels, the window assembly, one of the attachment fasteners and the trim panel in accordance with the one embodiment.

The window sash 26 has a flat recessed profile, as indicated in FIG. 11 in cross-section. The window sash 26 completely surrounds the window opening 28 and includes a plurality of apertures $A_1$. The apertures $A_1$ are spaced apart from one another defining a window installation pattern, as is described further below. The window sash 26 further defines a peripheral edge 30 that surrounds and defines the window opening 28. The peripheral edge 30 extends from the outer panel 22 to the inner panel 24, as best shown in FIG. 11. Since the inner and outer panels 22 and 24 are otherwise conventional vehicle elements, further description is omitted for the sake of brevity, except where features of the window sash 26 and window opening 28 relate to the attachment fasteners 14, as described below.

Figure 3:
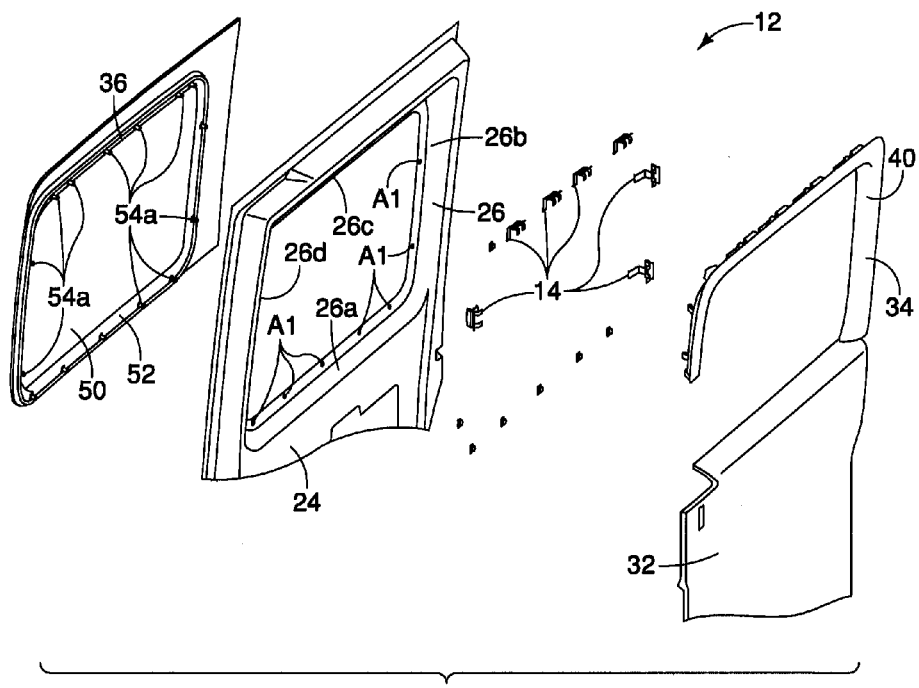
FIG. 3 is an exploded perspective view of the vehicle body assembly, showing body panels that define a window sash surrounding a window opening, a window assembly, a plurality of attachment fasteners and a trim panel in accordance with the one embodiment.
Figure 4:
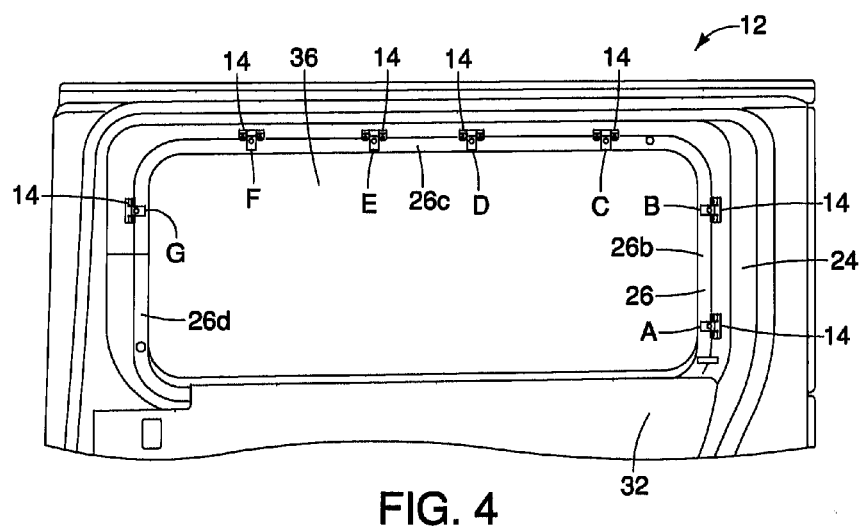
FIG. 4 is an interior view of the vehicle body assembly with the trim panel removed showing the plurality of attachment fasteners attached to the window sash of the body panels in accordance with the one embodiment.

As shown in FIGS. 2 and 3, the body assembly 12 also includes a lower trim panel 32, a window trim 34, a window assembly 36, a door latch mechanism 38 (shown only in FIG. 2) and the plurality of attachment fasteners 14 (shown in FIG. 3). In FIG. 4, the body assembly 12 is depicted with the window trim 34 and the door latch mechanism 38 removed to reveal features of the window sash 26 and the window assembly 36, as is described in greater detail below.

The lower trim panel 32 is, for instance, a decorative panel with a contoured or decorative outer surface that compliments the overall interior of the passenger compartment of the vehicle 10. The lower trim panel 32 attaches to the inner panel 24 of the body assembly 12 in a conventional manner, covering most of the inner panel 24 and also covering a lower portion 26a of the window sash 26, once installed. The window trim 34 is an elongated member that is shaped to fit over and cover a rearward portion 26b, an upper portion 26c and part of the forward portion 26d of the window sash 26 of the body assembly 12. A lower area of the forward portion 26d of the window sash 26 is covered by the door latch mechanism 38, as shown in FIG. 2.

A description is now provided of the window trim 34 with reference to FIGS. 6-10. The window trim 34 has a decorative surface 40 shown in FIG. 3 and a fastening surface 42, shown in FIG. 6. The decorative surface 40 is provided with a contour and coloring that corresponds to decorative features within the passenger compartment of the vehicle 10, in a conventional manner. The fastening surface 42 includes a plurality of attachment flanges 44, a first alignment projection 46 and a second alignment projection 48. The attachment flanges 44 are all basically the same. Therefore description of one of the attachment flanges 44 applies to all of the attachment flanges 44.

Figure 6:
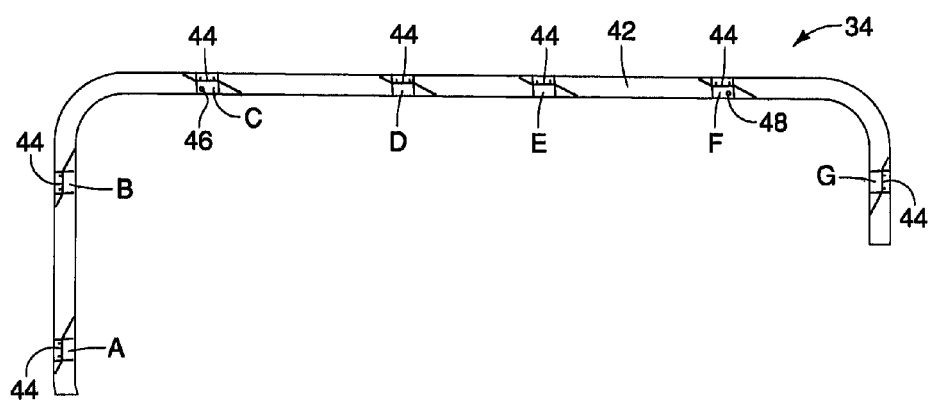
FIG. 6 is a plan view of the trim panel showing a fastening surface that includes a plurality of attachment flanges in accordance with the one embodiment.

As shown in FIG. 6, there are seven attachment flanges 44. For convenience, the positions of each of the seven attachment flanges 44 have been labeled locations A, B, C, D, E, F and G. Although seven of the attachment flanges 44 are depicted, the number of attachment flanges 44 is not fixed. A smaller number or larger number of attachment flanges 44 can be included on the window trim 34 depending upon the design and size of the window trim 34. The attachment flanges 44 at locations A and B attach to attachment fasteners 14 positioned along the section 26b of the window sash 26 with the window trim 34 installed to the body assembly 12. The attachment flanges 44 at locations C, D, E and F attach to attachment fasteners 14 positioned along the section 26c of the window sash 26 with the window trim 34 installed to the body assembly 12. The attachment flange 44 at location G attaches to attachment fastener 14 positioned along the section 26D of the window sash 26 with the window trim 34 installed to the body assembly 12.

Figure 7:
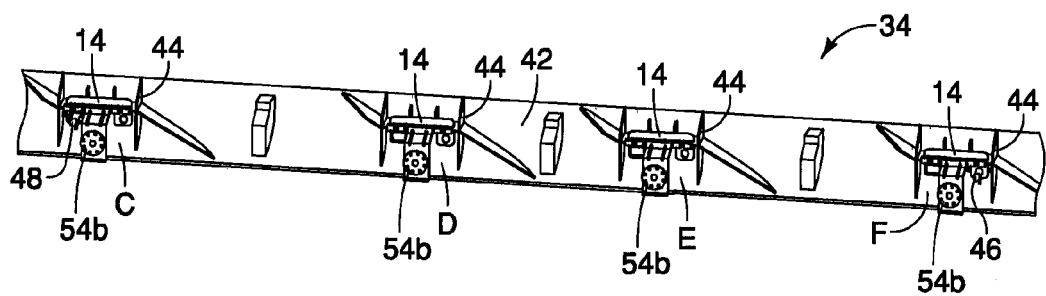
FIG. 7 is an enlarged plan view of a portion of the trim panel, showing the fastening surface and four of the attachment flanges with the attachment fasteners attached to the attachment flanges in accordance with the one embodiment.
Figure 8:
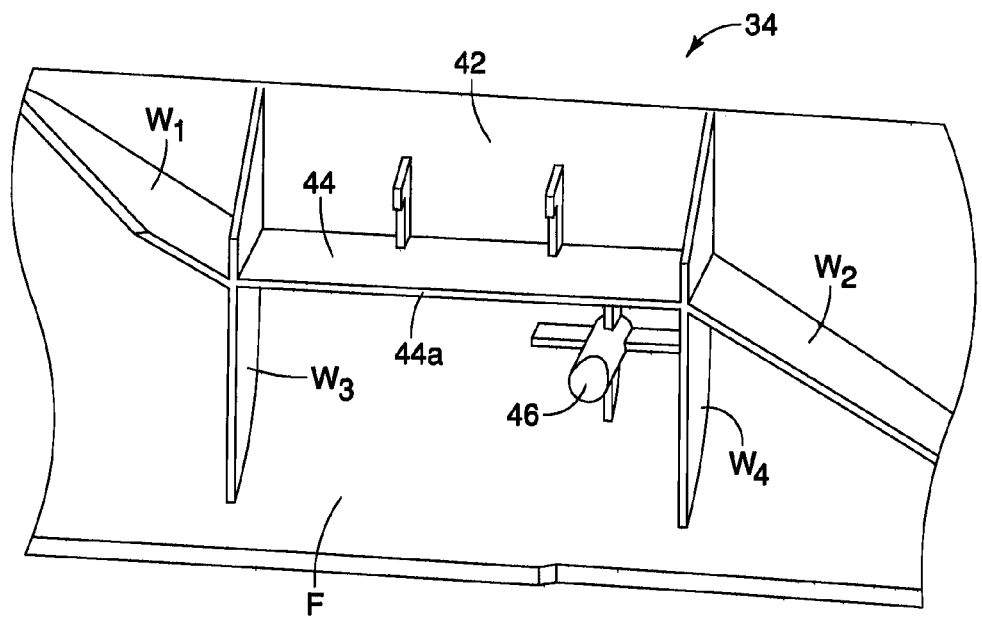
FIG. 8 is another enlarged plan view of a portion of the trim panel, showing one of the attachment flanges and a first alignment projection in accordance with the one embodiment.

As indicated in FIGS. 7 and 8, each of the attachment flanges 44 includes webbing $W_1$, $W_2$, $W_3$ and $W_4$, and a tongue 44a. The webbing $W_1$, $W_2$, $W_3$ and $W_4$ provides the attachment flange 44 with rigidity and strength such that the window trim 34 can be fixedly installed to the attachment fasteners 14 and the body assembly 12, as is described below. The tongue 44a is a flat projection that extends from the fastening surface 42 of the window trim 34. As mentioned above all of the attachment flanges 44 are identical and oriented relative to one another such that the attachment flanges 44 can be simultaneously installed to the attachment fasteners 14. Therefore, each of the attachment flanges 44 includes a corresponding tongue 44a that engages a corresponding one of the attachment fasteners 14, as is described in greater detail below.

Figure 15:
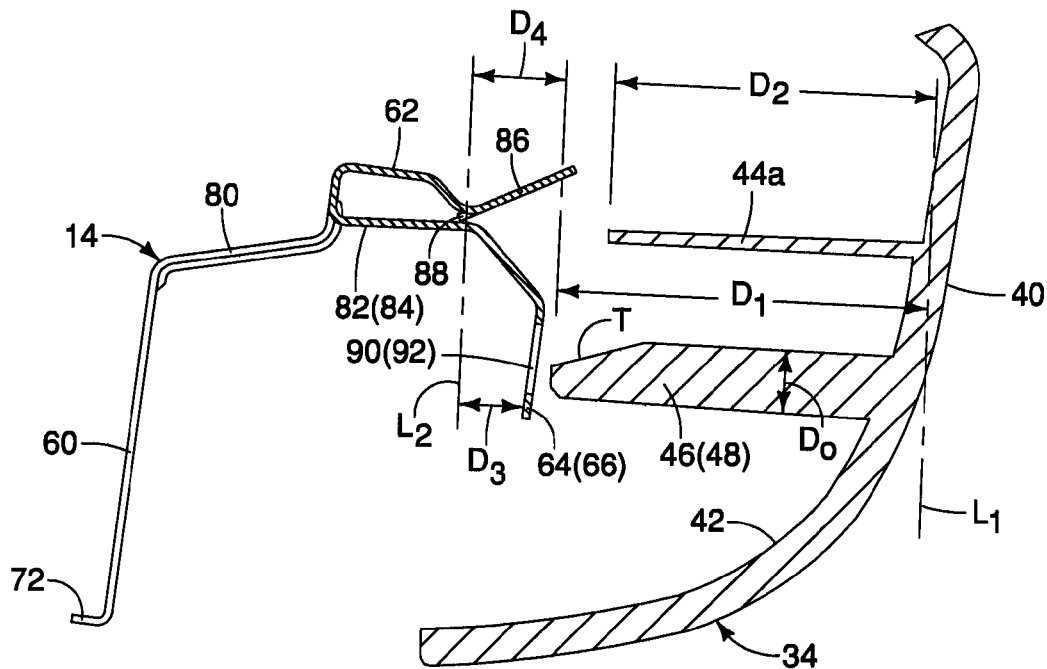
FIG. 15 is a cross-sectional view of the one of the attachment fasteners and the trim panel just prior to installation of the trim panel to the attachment fastener in accordance with the one embodiment.
Figure 16:
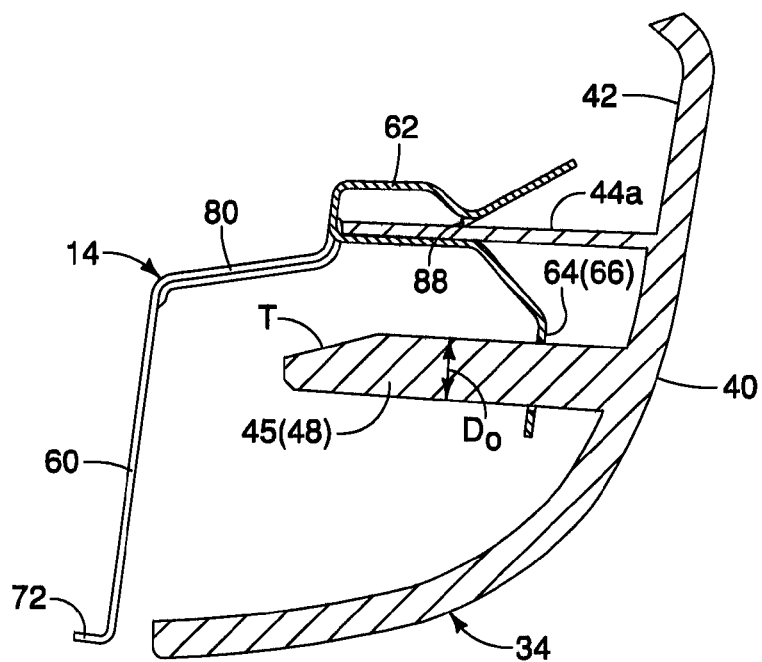
FIG. 16 is another cross-sectional view of the one of the attachment fasteners and the trim panel similar to FIG. 15, but showing the trim panel installed to the attachment fastener in accordance with the one embodiment.

As shown in FIG. 7, the first, alignment projection 46 is located adjacent to the attachment flange 44 at location F. The second alignment projection 48 is located adjacent to the attachment flange 44 at location C. The first and second alignment projections 46 and 48 are cylindrically shaped protrusions that extend from the fastening surface 42 of the window trim 34. Further, the first and second alignment projections 46 and 48 extend in a direction parallel to each of the tongues 44a, as indicated in FIGS. 11, 15 and 16. Further, as indicated in FIG. 15, a line $L_1$ is drawn perpendicular to the tongue 44a at an intersection of the tongue 44a and the fastening surface 42 of the window trim 34. The first and second alignment projections 46 and 48 extend a first distance $D_1$ from the line $L_1$ and the tongue 44a extends a second distance $D_2$ from the line $L_1$. The first distance $D_1$ is greater than the distance $D_2$. As well, the first and second alignment projections 46 and 48 extend from the fastening surface 42 a greater distance than the tongue 44a extends from the fastening surface 42. Put more simply, the first and second alignment projections 46 and 48 are longer than the tongue 44a.

A distal end of each of the first and second alignment projections 46 and 48 has a taper T, as shown in FIGS. 15 and 16. Further, as shown in FIGS. 15 and 16, each of the first and second alignment projections 46 and 48 has a diameter $D_O$.

A description of the window assembly 36 is now provided with reference to FIGS. 3 and 11. The window assembly 36 basically includes window glass 50, a surround 52 and bolts 54. The surround 52 is a window glass supporting member that completely surrounds the periphery of the window glass 50, forming a frame or support element. The surround 52 is made of a rubber or polymer material that has a small degree of flexibility, but has sufficient rigidity to retain the window glass 50 securely when installed to the window sash 26. The bolts 54 are metallic and include a threaded portion 54a and a head portion 54b. There is a plurality of the bolts 54. The head portion 54b of each of the bolts 54 is embedded within or otherwise non-movably adhered to the surround 52.

The threaded portions 54a of the bolts 54 are positioned around the surround 52 in the above mentioned window installation pattern. Specifically, the threaded portions 54a extend from the surround 52 in alignment with the apertures $A_1$ in the window sash 26, as indicated in FIG. 3. Also, as indicated in FIG. 4 seven of the bolts 54 are positioned such that they are in alignment with the locations A, B, C, D, E, F and G of the attachment flanges 44 of the window trim 34. More specifically, each of the seven of the bolts 54 extends through a corresponding one of the apertures $A_1$ in the window sash 26 at locations A, B, C, D, E, F and G and is received by a corresponding one of the attachment fasteners 14, such that the attachment fasteners 14 can be fixed in place to receive corresponding ones of the seven attachment flanges 44.

Figure 12:
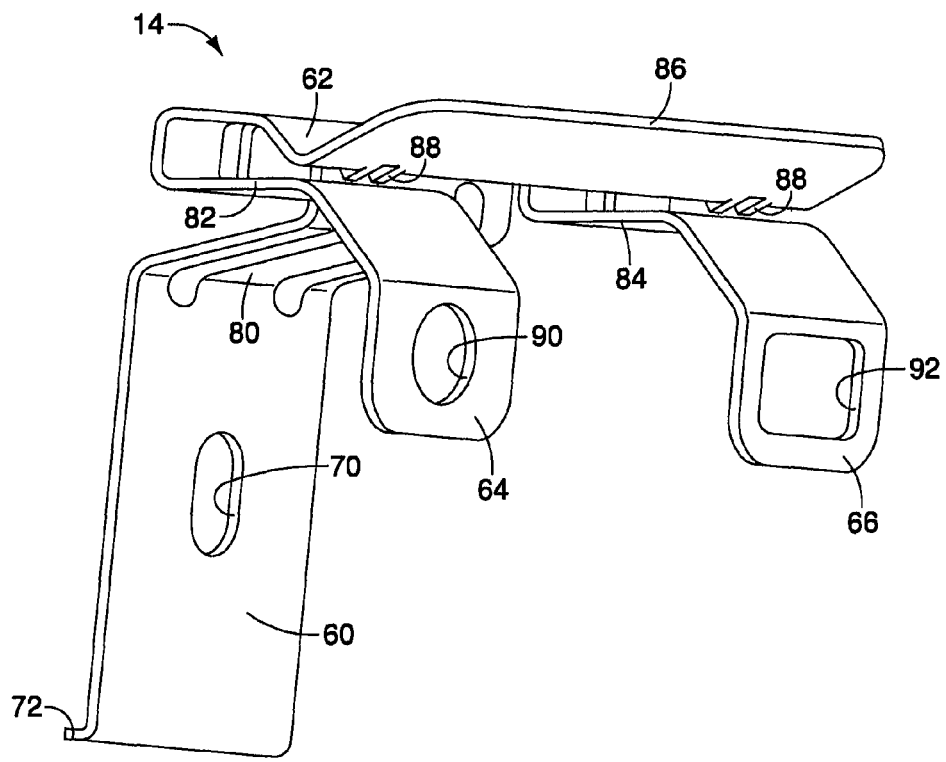
FIG. 12 is a perspective view of one of the attachment fasteners shown removed from the vehicle in accordance with the one embodiment.
Figure 13:
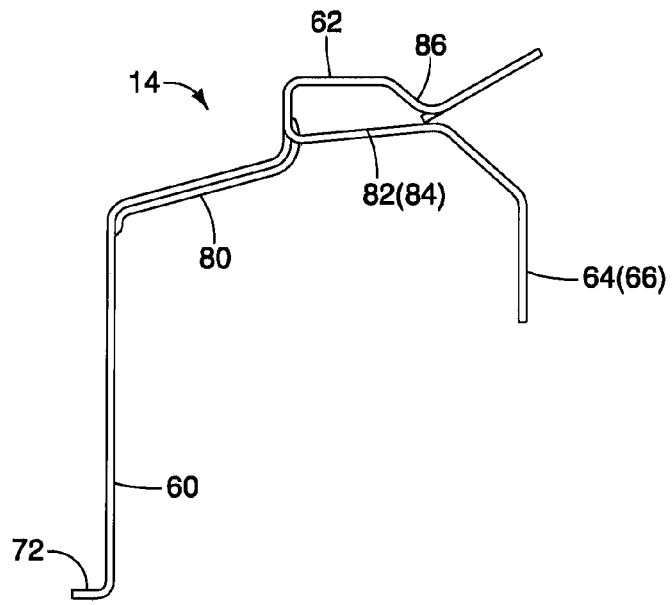
FIG. 13 is a side view of the one of the attachment fasteners shown removed from the vehicle in accordance with the one embodiment.
Figure 14:
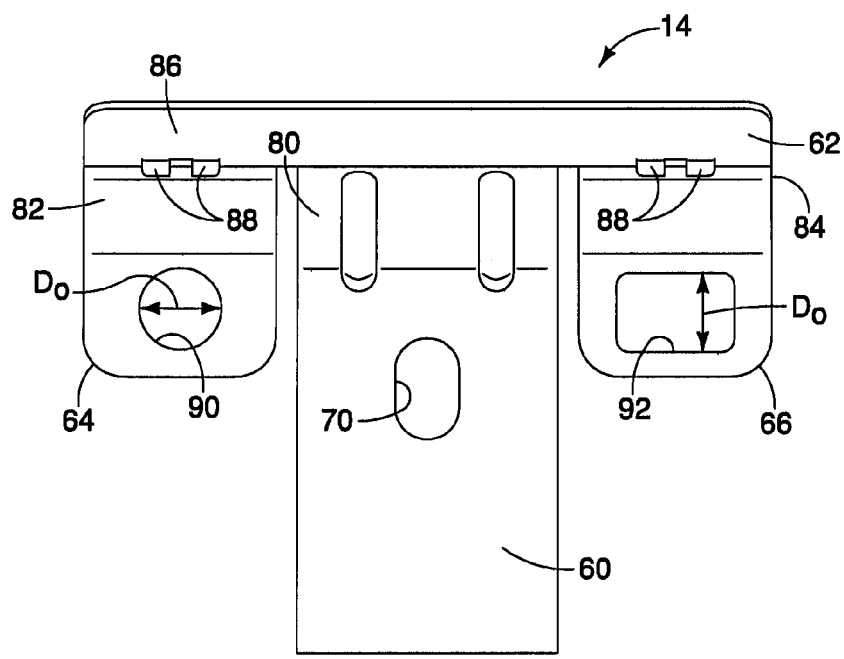
FIG. 14 is a plan view of the one of the attachment fasteners shown removed from the vehicle in accordance with the one embodiment.

A description of the attachment fasteners 14 is now provided with reference to FIGS. 12, 13 and 14. The attachment fasteners 14 are all identical. Therefore, description of one of the attachment fasteners 14 is applicable to all of the attachment fasteners 14.

The attachment fastener 14 shown in FIGS. 12, 13 and 14 includes a base 60, a trim clip 62, a first trim alignment flange 64 and a second trim alignment flange 66. The base 60, the trim clip 62, the first alignment flange 64 and the second trim alignment flange 66 are parts of a continuous metal sheet. In other words, the attachment fastener 14 is a single monolithic element made from a single piece of metal or sheet metal.

Figure 5:
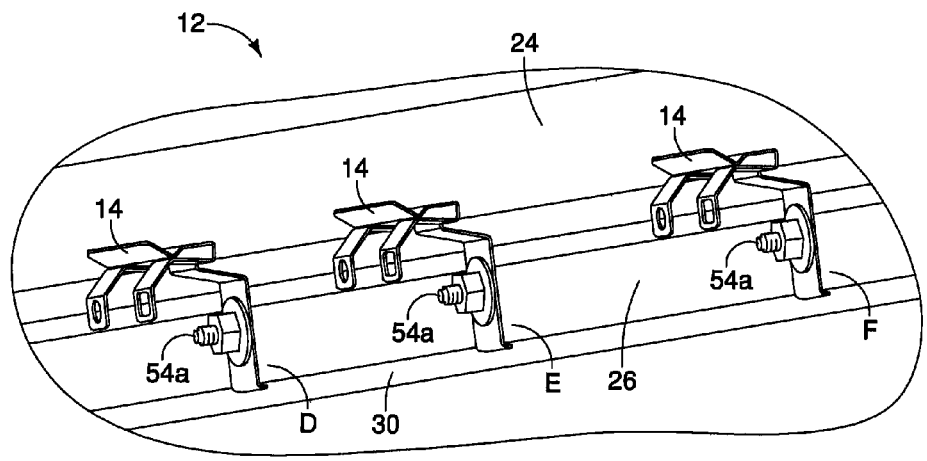
FIG. 5 is a perspective view of a portion of the vehicle body assembly, showing a portion of the window sash with three of the attachment fasteners attached thereto in accordance with the one embodiment.

The base 60 is generally flat with a flat surface that is dimensioned to contact the surface of the sash section 26. The base 60 includes an aperture 70 and an alignment projection 72. The aperture 70 has an oblong shape, as shown in FIGS. 12 and 14. The aperture 70 partially defines a vehicle body attachment structure. As indicated in FIGS. 5 and 11, the threaded portion 54a of the bolt 54 extends through the aperture 70. Since the aperture 70 is oblong, the position of the attachment fastener 14 can be adjusted relative to the oblong shape of the aperture 70. A threaded nut 74 and washer are installed to the threaded portion 54a thereby securing the attachment fastener 14 to the window sash 26. The alignment projection 72 extends from the base 60 in a direction away from the trim clip 62. The alignment projection 72 is shaped to contact the peripheral edge 30 such that during installation of the attachment fastener 14, the alignment projection 72 provides positioning alignment between the window opening 28 and the attachment fastener 14. Specifically, during installation the alignment projection 72 can be oriented to contact the peripheral edge 30 for desired alignment.

The trim clip 62 includes an extension 80 and a plurality of fingers, including a first finger 82, a second finger 84 and a third finger 86. The first finger 82 and the second finger 84 have a side-by-side relationship with the first and second fingers 82 and 84 facing the third finger 86 to define a trim panel retaining area therebetween. The extension 80 of trim clip 62 extends outwardly and away from a first end of the base 60. The alignment projection 72 extends from a second end of the base 60 in a direction away from the trim clip 62 and the first and second trim alignment flanges 64 and 66. The third finger 86 also includes barbs 88 that are shaped to contact a corresponding tongue 44a of one of the attachment flanges 44 of the window trim 34 once installed.

The first trim alignment flange 64 extends outwardly from the first finger 82 of the trim clip 62. The first trim alignment flange 64 is configured to align the window trim 34 relative to the trim clip 62 during installation of the window trim 34 to the trim clip 62.

The second trim alignment flange 66 extends outwardly from the second finger 84. The first trim alignment flange 64 and the second trim alignment flange 66 extend in directions parallel to the base 60. The first trim alignment flange 64 defines a round alignment aperture 90 and the second trim alignment flange 66 defines a rectangular alignment aperture 92.

As shown in FIG. 13, the base 60, the trim clip 62 and the first and second trim alignment flanges 64 and 66 cooperate to define an upside down overall U-shape.

Figure 9:
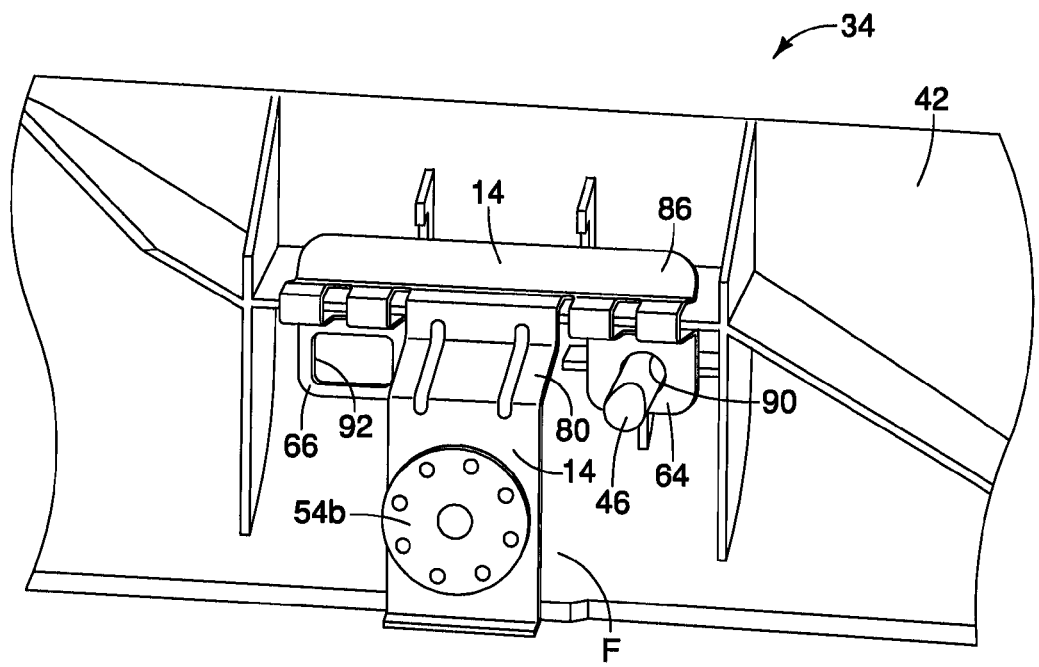
FIG. 9 is another enlarged plan view of the portion of the trim panel shown in FIG. 8, showing the attachment flange and the first alignment projection installed to one of the attachment fasteners in accordance with the one embodiment.
Figure 10:
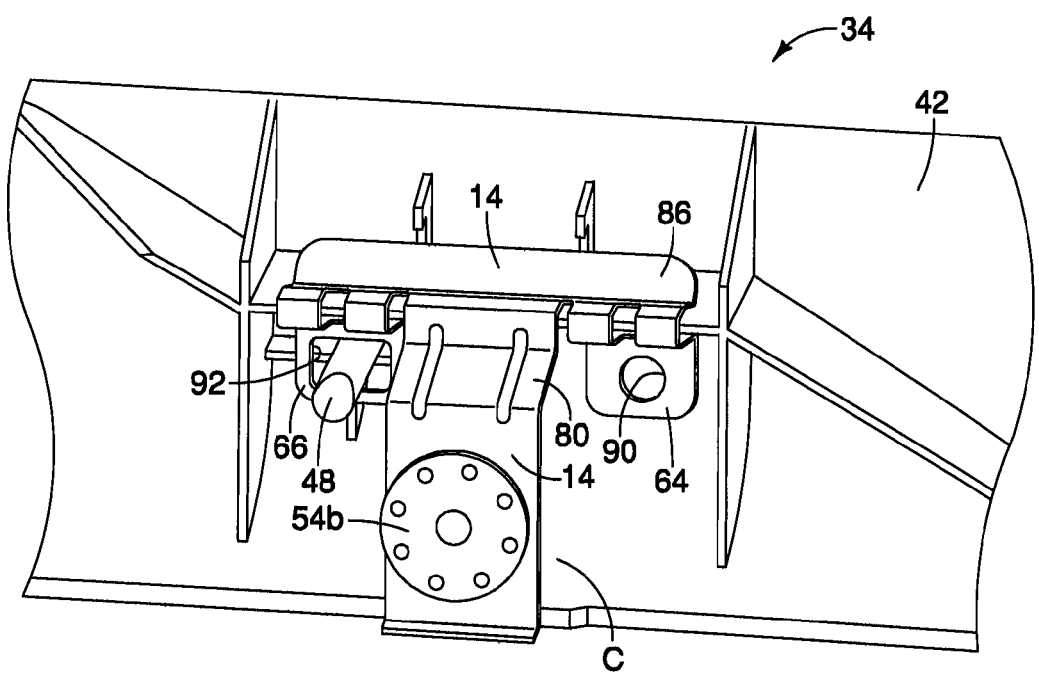
FIG. 10 is another enlarged plan view of another portion of the trim panel, showing another attachment flange and a second alignment projection installed to another one of the attachment fasteners in accordance with the one embodiment.

As shown in FIG. 14, the apertures 90 and 92 in the first and second trim alignment flanges 64 and 66 provide differing alignment features. Specifically, the diameter of the aperture 90 is approximately equal to the diameter $D_0$ of the first alignment projection 46. Hence, when the first alignment projection 46 is installed to the aperture 90, the first alignment projection 46 aligns the window trim 34 vertically and horizontally at the installation location F, as indicated in FIG. 9. The vertical height of the aperture 92 is approximately equal to the diameter $D_0$ of the second alignment projection 48. Hence, when the second alignment projection 48 is installed to the aperture 92, the second alignment projection 48 aligns the window trim 34 vertically only at the installation location F, as indicated in FIG. 10.

As indicated in FIG. 15, the first and second alignment projections 46 and 48 extend further from the fastening surface 42 of the window trim 34 than the tongues 44a. Hence, the first and second alignment projection 46 and 48 come into contact with the attachment fasteners 14 prior to the tongues 44a coming into contact with the attachment fasteners 14. The taper T makes installation of the first and second projections 46 and 48 into the apertures 90 and 92 easier.

As mentioned above, the third finger 86 includes the barbs 88 which hold the tongue 44a once installed. The barbs 88 define an initial contact location between the tongue 44a and the attachment fastener 14. As shown in FIG. 15, a line $L_2$ is drawn parallel to line $L_1$, with the line $L_2$ passing through the barbs 88. The first and second trim alignment flanges 64 and 66 and the apertures 90 and 92 are horizontally are spaced apart from the line $L_2$ by a distance $D_3$. A distal end of the third finger 86 is spaced apart from the line $L_2$ by a distance $D_4$. The difference between the distance $D_3$ and $D_4$ is less than the difference between the distance $D_1$ and $D_2$. Therefore, the first and second alignment projections 46 and 48 engage the attachment fasteners 14 prior to the tongues 44a contacting the third finger 86. Further, the distal end of the third finger 86 is tapered providing a funnel like surface to further guide the tongues 44a into the trim panel retaining area. Hence, during installation of the window trim 34 (the trim panel) to the plurality of attachment fasteners 14, the first and second alignment projections 46 and 48 contact the first and second trim alignment flanges 64 and 66 prior to an adjacent one of tongues 44a (the attachment flanges) becoming engaged within the first, second and third fingers 82, 84 and 86 (the trim panel retaining area).

The first and second alignment projection 46 and 48 are therefore inserted into the apertures 90 and 92 prior to installation of the tongues 44a of the window trim 34 into the trim clip 62 of the attachment fasteners 14. The first and second trim alignment flanges 64 and 66 and the apertures 90 and 92 are positioned and oriented at specific locations relative to the remainder of the attachment fastener 14 such that interaction with the first and second alignment projections 46 and 48 aligns the window trim 34 in a specific and desired orientation and location relative to body assembly 12.

The alignment features of the first and second alignment projection 46 and 48, and the apertures 90 and 92 provide a reliable means for installing the window trim 34 to the window sash 26. Specifically, the attachment fasteners 14 are all aligned with the window opening 28 by contact between the alignment projection 72 of each of the attachment fasteners 14 and the peripheral edge 30 of the window opening 28. Since the first and second alignment projections 46 and 48 and the apertures 90 and 92 align the tongues 44a with the trim panel retaining area defined between the first and second fingers 82 and 84 and the third finger 86 of the trim clip 62 of the attachment fasteners 14, the window trim 34 can be quickly and reliably installed to the body assembly 12.

Once the first and second alignment projections 46 and 48 are inserted into respective ones of the apertures 90 and 92 at locations C and F, the tongues 44a are aligned with and can be forced or pressed into engagement with the trim clip 62. Thereafter, the first, second and third fingers 82, 84 and 86 (the plurality of fingers) grasp and retain the corresponding one of the plurality of the tongues 44a of the trim clip 62 (attachment flanges of the trim panel).

It should be understood from the drawings and description herein that the attachment fasteners 14 can be used in any of a variety of locations within a vehicle. Specifically, the window assembly 36 can be installed to areas of a vehicle other than a sliding door. The attachment fasteners 14 can be used in any location of the vehicle 10 where a window assembly is installed. In other words, the attachment fasteners 14 can be installed to a vehicle body panel and trim panel regardless of the location within the vehicle 10.

The various features of the vehicle 10 other than the attachment fasteners 14 and the window trim 14, are conventional components that are well known in the art. Since these other features are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle trim attachment fastener. Accordingly, these terms, as utilized to describe the present invention should be interpreted relative to a vehicle equipped with the vehicle trim attachment fastener.

The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim attachment fastener comprising:
    a base having a vehicle body attachment structure;
    a trim clip extending outwardly away from a first end of the base, the trip clip including a plurality of attachment fingers defining a trim panel retaining area therebetween; and
    a first trim alignment flange extending outwardly from one of the plurality of attachment fingers away from the trim panel retaining area, the first trim alignment flange defining a trim alignment aperture and being configured to align a trim panel relative to the trim clip during installation of the trim panel to the trim clip.

2. The vehicle trim attachment fastener according to claim 1, wherein
    the base, the trim clip and the first trim alignment flange cooperate to define an overall U-shape.

3. The vehicle trim attachment fastener according to claim 1, further comprising
    a vehicle body alignment projection extending from the base in a direction away from the trim clip.

4. The vehicle trim attachment fastener according to claim 1, wherein
    the plurality of attachment fingers includes a first finger, a second finger and a third finger, the first finger and the second finger having a side-by-side relationship with the first and second fingers facing the third finger to define the trim panel retaining area therebetween.

5. The vehicle trim attachment fastener according to claim 1, further comprising
    a second trim alignment flange extending outwardly from another one of the plurality of attachment fingers.

6. The vehicle trim attachment fastener according to claim 1, wherein
    the first trim alignment flange is configured to receive a first portion of the trim panel through the trim alignment aperture and the trim clip is configured to receive a second portion of the trim panel within the trim panel retaining area during installation of the trim panel to the trim clip, with the first and second portions of the trim panel being spaced apart from one another.

7. The vehicle trim attachment fastener according to claim 5, wherein
    the trim alignment aperture is round and the second trim alignment flange defines a rectangular alignment aperture.

8. The vehicle trim attachment fastener according to claim 1, wherein
    the first trim alignment flange extends in a direction parallel to the base.

9. The vehicle trim attachment fastener according to claim 1, wherein
    the base, the trim clip and the first trim alignment flange are parts of a continuous metal sheet.

10. A vehicle body assembly comprising:
    a vehicle body panel;
    a trim panel having a plurality of attachment flanges and a first alignment projection; and
    a plurality of attachment fasteners disposed between the vehicle body panel and the trim panel, each of the attachment fasteners having a base, a trim clip and a first trim alignment flange, the base having a vehicle body attachment structure fixedly coupling the base to the vehicle body panel, the trim clip having a plurality of fingers grasping and retaining a corresponding one of the plurality of attachment flanges of the trim panel, and the first trim alignment flange extending from an end of one of the plurality of fingers and having an aperture with the first alignment projection extending into the aperture aligning the trim panel with the trim clip.

11. The vehicle body assembly according to claim 10, wherein
each of the plurality attachment fasteners is formed such that the base, the trim clip and the first trim alignment flange cooperate to define an overall U-shape.

12. The vehicle body assembly according to claim 11, wherein
each of the plurality attachment fasteners is formed such that the trim clip extends away from a first end of the base, and
the base includes a vehicle body alignment projection that extends from a second end of the base in a direction away from the trim clip and the first trim alignment flange.

13. The vehicle body assembly according to claim 11, wherein
each of the plurality attachment fasteners is formed such that the plurality of fingers includes a first finger, a second finger and a third finger, the first finger and the second finger having a side-by-side relationship with the first and second fingers facing the third finger to define a trim panel retaining area therebetween.

14. The vehicle body assembly according to claim 10, wherein
the trim clip of each of the plurality of attachment fasteners further comprises a second trim alignment flange that extents outwardly from another one of the plurality of fingers.

15. The vehicle body assembly according to claim 14, wherein
the first trim alignment flange and the second trim alignment flange extend in directions parallel to the base.

16. The vehicle body assembly according to claim 14, wherein
the trim panel includes a second alignment projection spaced apart from the first alignment projection, and
each of plurality of attachment fasteners is formed such that the first trim alignment flange has a round aperture and the second trim alignment flange has a rectangular shaped aperture, with the first alignment projection extending through the round aperture of a first one of the plurality of attachment fasteners and the second alignment projection extending through the rectangular shaped aperture of a second one of the plurality of attachment apertures.

17. The vehicle body assembly according to claim 13, wherein
the first trim alignment flange extends outwardly from the end of the one of the plurality of fingers away from the trim panel retaining area.

18. The vehicle body assembly according to claim 10, wherein
the trim panel has a first surface with the plurality of attachment flanges and the first alignment projection extending therefrom, the first alignment projection extending a first distance away from the first surface and each of the attachment flanges extending a second distance away from the first surface, the first distance being greater than the second distance, and
each of the plurality of attachment fasteners is configured such that the plurality of fingers defines a trim panel retaining area therebetween, a distal end of the trim panel retaining area being located a third distance away from the base and the first alignment projection being located a fourth distance away from the base greater than the third distance such that during installation of the trim panel to the plurality of attachment fasteners, the first alignment projection is configured to contact the first trim alignment flange prior to an adjacent one of the attachment flanges engaging the trim clip within the trim panel retaining area.

19. The vehicle body assembly according to claim 10, wherein
the first trim alignment flange extends in a direction parallel to the base.

20. The vehicle body assembly according to claim 10, wherein
the base, the trim clip and the first trim alignment flange are parts of a continuous metal sheet.

* * * * *